UNITED STATES PATENT OFFICE.

JOSEPH C. HAMES, OF GOLDFIELD, NEVADA.

PROCESS OF ASSAYING.

No. 913,129.

Specification of Letters Patent.

Patented Feb. 23, 1909.

Application filed September 10, 1908. Serial No. 452,436.

*To all whom it may concern:*

Be it known that I, JOSEPH C. HAMES, a citizen of the United States, residing at Goldfield, in the county of Esmeralda and State of Nevada, have invented new and useful Improvements in Processes of Assaying, of which the following is a specification.

My present invention pertains to assaying, and consists in an expeditious and otherwise advantageous process of assaying.

In assaying for gold I take a definite quantity, say one-half assay ton, of pulp, and add to the same 17 parts of a composition consisting of the following ingredients, combined in substantially the proportions stated, viz:

Gum camphor .... 1 part.
Iodin crystals ..... 20.736 parts.
Potassium iodid ... 41.471 parts.
Water .......... 310 parts.

I find from experiments that the best results are obtained by adding to the pulp 3 parts of the camphor, iodin and potassium iodid in a dry state, and 14 parts of water, in the order named, and then suitably stirring or agitating the mass.

To the solution from the assay described in the foregoing I add ¼ dram of sodium amalgam, this latter to precipitate gold, after which the metallic gold may be recovered in any of the well known ways extant.

In assaying for silver I practice the process described up to and including the addition of the gum camphor, iodin crystals and potassium iodid and the water to the pulp. I then add to the whole sodium cyanid corresponding in quantity to the pulp. Then I take the solution from said assay, and precipitate the silver on zinc shavings or with zinc dust. With this done, the mass of zinc shavings or zinc dust is dissolved in nitric acid after which water and about 200 milligrams of sodium hyposulfate are added to the acid. This produces a clear solution to which is added one drop of a mixture comprising 2 ounces of water—and 40 drops of the solution from the gold assay; the said drop serving to indicate in the solution from the silver assay a certain amount of silver.

Having described my invention, what I claim and desire to secure by Letters-Patent, is:

1. The process of assaying for precious metal, which consists in adding to a quantity of ore pulp a solution of camphor, iodin and potassium iodid, and ascertaining the quantity of precious metal in the solution.

2. The process of assaying for gold, which consists in adding to a quantity of ore pulp a solution of camphor, iodin and potassium iodid, and adding sodium amalgam to the solution from the assay to precipitate the gold.

In testimony whereof I have hereunto set my hand in presence of two subscribing witnesses.

JOSEPH C. HAMES.

Witnesses:
E. F. HAMES,
R. J. PIERCE.